United States Patent [19]
Bowen

[11] 3,775,647
[45] Nov. 27, 1973

[54] VARIABLE IMPEDANCE

[75] Inventor: Jack L. Bowen, Waseca, Minn.

[73] Assignee: E. F. Johnson Company, Waseca, Minn.

[22] Filed: Aug. 21, 1972

[21] Appl. No.: 282,446

[52] U.S. Cl. .......... 317/249 R, 317/101 C, 338/183
[51] Int. Cl. .......... H01g 5/04
[58] Field of Search .......... 317/249 R, 249 T, 317/249 D, 251; 338/183

[56] References Cited

UNITED STATES PATENTS

| | | | |
|---|---|---|---|
| 1,567,068 | 12/1925 | Lindberg | 317/251 |
| 2,475,144 | 7/1949 | Kodama | 317/249 D |
| 3,679,940 | 7/1972 | Newman | 317/249 R |

FOREIGN PATENTS OR APPLICATIONS

| | | | |
|---|---|---|---|
| 768,410 | 2/1957 | Great Britain | 317/249 T |

*Primary Examiner*—E. A. Goldberg
*Attorney*—Carlsen, Carlsen & Sturm

[57] ABSTRACT

A variable impedance is comprised of a stationary base having a surface which is partially coated with a conductive material to form a first element of the variable impedance. A slidable base is mounted for longitudinal movement on the stationary base. The slidable base includes conductive biasing members to bias a second element of the variable impedance carried thereby, to engage the first element on the stationary base. One of the elements is comprised of suitable impedance material for the variable impedance range desired and includes an electrically conductive top surface. The slidable base includes an electrically conductive portion to form a sliding electrical contact with a conductive electrode on the stationary base so that the impedance may be varied by moving the slidable base longitudinally on the stationary base.

12 Claims, 8 Drawing Figures

VARIABLE IMPEDANCE

BACKGROUND OF THE INVENTION

Many electronic devices, notably radio transmitters and receivers, require electrical components which require adjustment throughout the life span of the device. Inexpensive miniaturized components have substantially reduced the cost of electronic devices as well as their size in recent years. However, the adjustable components which must be included in some electronic devices have not proven to be as readily suspectible to miniaturization and cost reduction as components having permanently fixed values. One important requirement of such variable value components is that they be suitable for mounting on flexible printed circuit boards. One difficulty with many previously available variable components has been that, once permanently mounted, there was no method of changing the range within which the component was variable other than by completely replacing the component. Thus, it would be desirable to have a standardized component which could have its range of values conveniently altered after installation as well as allowing the assembly of many different components from a small number of basic parts.

SUMMARY OF THE INVENTION

A variable impedance component is provided and shown as a variable capacitor in the illustrated embodiment of the invention. The impedance device may be suitably constructed according to the same basic principles to provide, for example, a variable resistance or other form of impedance as well.

The variable capacitor is comprised of a nonconductive elongated stationary base which has an electrode on its upper surface which is comprised of an electrically conducting material leaving the remaining portion nonconducting. The conductive surface forms one plate of the capacitor. A slidable base is provided for sliding longitudinal movement of the stationary base from one extreme position, overlying the electrically conducting material coating one portion of the stationary base, to another extreme position, overlying a nonconducting portion of the stationary base. The slidable base has two end portions from which finger-like members of spring material extend to engage a removable contact contained within the slidable base. The contact has an electrically conductive upper surface to form the other plate of the capacitor. The lower surface of the contact is comprised of suitable dielectric material which slides on the stationary base from one end to the other. The finger-like spring members maintain the contact in close contact with the top of the stationary base. In the form of the invention herein illustrated the slidable base is in slidable conductive engagement with an electrode on the stationary base. The last named electrode and the electrode on the top surface of the stationary base are provided with terminals for connection to other components or devices.

From the above description it will be appreciated that the variable capacitor consists of only three portions: a stationary base; a slidable base, disposed on the stationary base; and the contact disposed within the slidable base.

A common stationary base may be used for all variable capacitors within a comparatively wide range of variable variables. For any given capacitor the contact may be changed to increase or decrease the capacitance thereof. The electrode on the upper portion of the stationary base may also be shaped to provide any desired variable function of capacitance with linear sliding motion of the slidable base. Thus, a variable capacitor according to the present invention has a substantial degree of flexibility with respect to intended use and with respect to the ability to incorporate standardized parts.

DESCRITPION OF THE DRAWINGS

DESCRIPTION OF THE ILLUSTRATED EMBODIMENT

Figures 1, 2, 3, 4, 5:
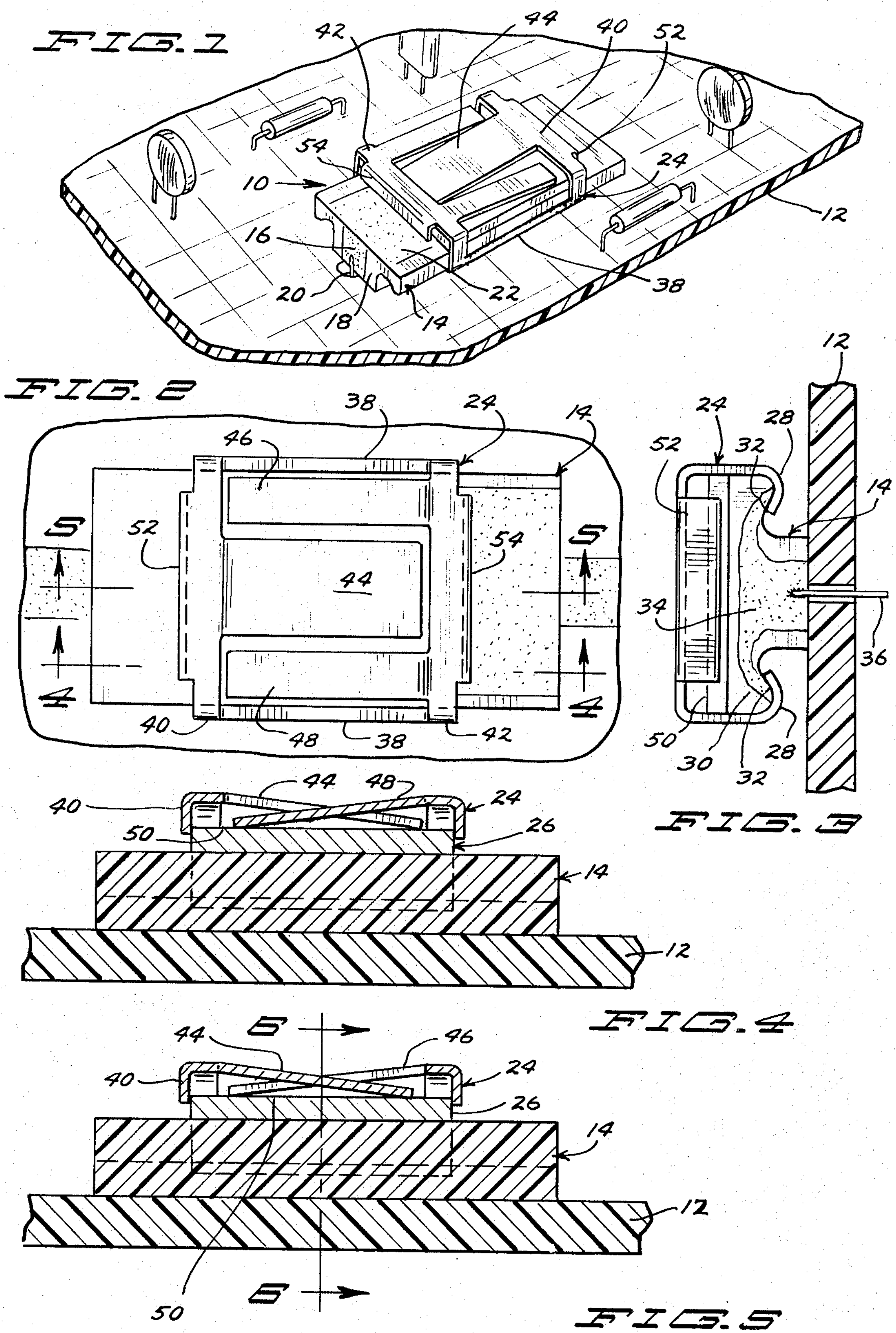
FIG. 1 is a perspective view of a variable impedance device according to the present invention and constituted as a variable capacitor mounted on a printed circuit board.
FIG. 2 is a top plan view of the capacitor shown in FIG. 1.
FIG. 3 is an end view of the device shown in FIG. 1 taken from the opposite end of that shown in FIG. 1.
FIG. 4 is a longitudinal sectional view along lines 4—4 of FIG. 2.
FIG. 5 is a longitudinal sectional view along lines 5—5 of FIG. 2.
Figure 6:
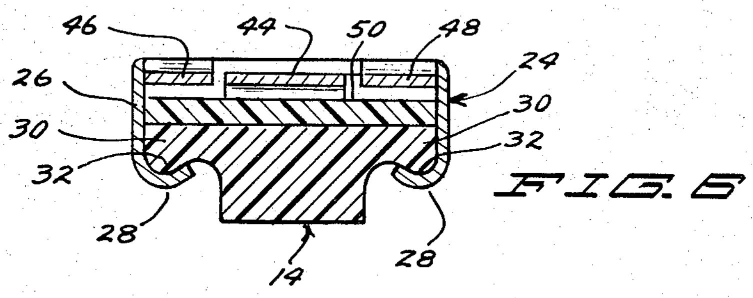
FIG. 6 is a cross-section view along lines 6—6 in FIG. 5.
Figure 7:
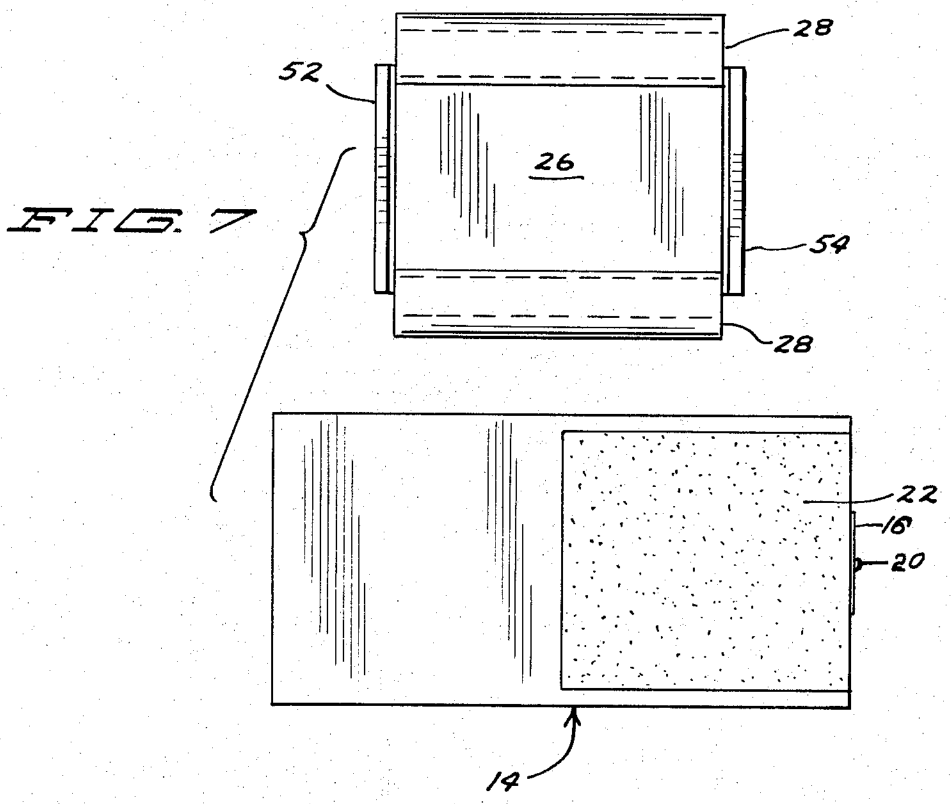
FIG. 7 is an exploded view of the device shown in FIG. 1 showing the bottom of the slidable base and the top of the stationary base.

Referring now to FIG. 1, a variable impedance device is shown in the form of a variable capacitor 10 mounted on a printed circuit board 12. Variable capacitor 10 includes an elongated stationary base 14 comprised of nonconductive material and securely mounted on a printed circuit board 12. This mounting may be by means such as gluing or the terminations provided as connecting leads may be used as the sole mounting means. Shown at one end of the stationary base 14 is a metallic conducting strip 16 extending across the face 18 of the stationary base to a terminal lead 20 which may be used in a manner conventional to provide a connection to printed circuit boards. Connecting strip 16 connects terminal 20 to an electrode 22 which is formed on the top surface of the stationary base 14. Electrode 22 may be metallized and is shown to extend longitudinally a distance roughly one-half the length of the stationary base 14. Electrode 22 may have any desired shape to produce a desired capacitive impedance characteristic as a result of adjustment of slidable base 24.

A slidably mounted slidable base 24 carries a contact 26 in sliding relation with respect to the surface of the stationary base 14. In FIG. 3, slidable base 24 is shown having a J-shaped flange 28 on each side which are adapted to engage complimentary shaped lips 30 on stationary base 14. Base 24 may be made entirely of conductive material such as copper, silver or some gold plated material for best conductivity.

As shown in FIG. 3, lip portions 30 of stationary base 14 are coated with conductive material 32 running longitudinally the length of base 14 to form a sliding conductive contact between the slidably mounted base 24 and the stationary base 14. At the opposite end of the stationary base from that seen in FIG. 1, and as best seen in FIG. 3, a terminal 36 is provided to connect with a conductive strip 34 on the other end of base 14 to electrically connect with the conducting surfaces 32.

Slidable base 24 includes side members 38 extending between end pieces 40 and 42. End piece 40 has a centrally located finger-like spring member 44 extending therefrom to engage the top of contact 26. End piece 42 has two laterally spaced apart finger-like spring members 46 and 48 extending therefrom to also engage contact 26. Finger members 44, 46 and 48 maintain electrical contact with an electrically conductive coating 50 on the top surface of contact 26. Finger members 44, 46 and 48 are configured and constructed to exert sufficient biasing forces against the contact so that it maintains a substantial uniform contact with the top of the base 14 and also exerts a sufficient counter force to maintain sliding conductive contact between conductive material 32 on lips 30 and J-shaped flanges 28. End pieces 40 and 42 are formed with locking tabs 52 and 53 which retain contact 26 within the rotor base. Thus, the finger spring members serve a multiple function in supporting slidable base 24 and contact 26 on stationary base 14.

Contact 26 is shown comprised of material exhibiting the volume impedance characteristic of a dielectric so that when conductive surface 50 is located in opposition to electrode 22 a capacitor is formed.

It will be appreciated that the capacity of the variable capacitor 10 may be varied by sliding the slidable base 24 back and force longitudinally on the stationary base 14, bringing a greater or lesser area of electrode 22 and conductive surface 50 in energy transferring proximity to one another. With the slidable base 24 and contact 26 completely displaced away from the end of the stationary base having the electrode 22, a minimum capacity may be achieved. If desired, electrically conducting surfaces 32 may be formed to extend for only a portion of the longitudinal length of base 14 so as to not underlie that portion of the base 14 under electrode 22, in which case a capacitance of essentially zero value may be obtained.

A further advantage of the present invention is that by removing slidable base 24 from stationary base 14, contact 26 may be replaced with another contact having a changed impedance characteristic, such as; a different dielectric characteristic, a different thickness, or a different shaped electrical conducting surface 50 so as to be able to vary the range of capacitance of the capacitor or the function of capacitance with linear variation of the position of the slidable base. Also a substitution of a material having a different temperature coefficient may be made to further alter the capacitor. In other words, the impedance range of the variable capacitor and the entire electrical characteristic of the variable capacitor may be greatly altered without requiring alteration of the structure of the electrical device in which the device is installed. In other words, base 14 may be left in its installed position on a chassis, such as a printed circuit board, and by changing the characteristics of contact 26 through appropriate substitution, the characteristics of the entire device may be varied at will.

Figure 8:
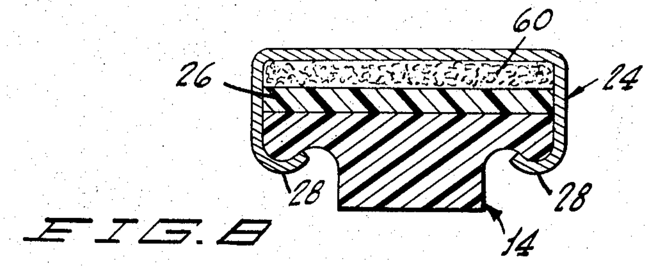
FIG. 8 is a cross section like that of FIG. 6 showing a further embodiment of my invention.

While the illustrative embodiment set forth above is believed to adequately demonstrate the principles of my invention, it may now be seen that numerous modifications may become apparent to those skilled in the art to which my invention pertains. For example, as illustrated in FIG. 8, the top of slidable base 24 may be of solid configuration and fingers 44, 41 and 48 may be replaced by a resilient, conductive member 60 comprised of a woven metallic mesh or metallic wool which will provide a biasing force in the desired direction.

The volume impedance characteristic of electrode 22 on the top surface of base 14 or the body of contact 26 may consist of the dielectric properties of a material, the resistive properties of a material, the magnetic properties of a material, the inductive properties of a material, or other properties which serve to provide an impedance reactance which may be varied to affect an electrical device or apparatus.

Having now therefore fully illustrated and described my invention, what I claim to be new and desire to protect by letters Patent is:

1. A variable impedance comprising in combination;

a longitudinally elongated stationary base member, said base member including a pair of outwardly opening grooves on its opposed major sides, at least one of said grooves including a conductive contact member and terminal means therefor, said stationary base member also including a further longitudinally elongated contact member and terminal means therefor, said contact members being insulated from each other;

a slidable base member diposed on said stationary base member and including a pair of inwardly extending portions on opposed side edges to slidably conductively engage the contact member in the grooves on said stationary base member, said slidable base member being comprised of current conductive material; a contact member carried by said slidable base member in energy transferring engagement with the further contact member on said stationary base member; and means operable to bias the contact member carried by said slidable base member in engagement with said further contact member, at least one of the contact members in the grooves on said stationary member, the further contact member on said stationary member, or the contact member carried by said slidable base member being comprised of material exhibiting a volume impedance characteristic whereby longitudinal slidable movement of said slidable base member on said stationary base member provides a variable impedance characteristic intermediate the terminals on the contact members on said stationary base member.

2. A variable impedance comprising in combination a longitudinally elongated stationary base member, said base member having a pair of outwardly opening grooves on opposite sides thereof; a slidable base member, comprised of material exhibiting conductive characteristics, slidably disposed on said base member and including a pair of inwardly extending portions on opposed side edges thereof to slidably engage the grooves on said stationary base member; a first contact member disposed in said slidable base member in energy transferring engagement with said stationary base member; a second longitudinally elongated contact member disposed on said stationary base member; a third longitudinally elongated contact member disposed on said stationary base member; current conductive biasing means disposed intermediate said slidable base member and said first contact member, at least one of said contact members being comprised of material exhibiting a volume impedance characteristic and the others of said contact members being comprised of current conductive material, whereby movement of said slidable base member on said stationary base member provides a variable impedance characteristic intermediate terminals connected to said second and third contact members.

3. The apparatus of claim 2 in which the first contact member is comprised of material exhibiting a volume impedance characteristic.

4. The apparatus of claim 2 in which at least one of the contact members is comprised of material exhibiting dielectric characteristics.

5. The apparatus of claim 2 in which the current conductive biasing means is comprised of a plurality of resilient conductive members.

6. The apparatus of claim 5 in which the conductive biasing means is comprised of a conductive mesh.

7. The apparatus of claim 2 in which the second contact member is comprised of material exhibiting a volume impedance characteristic.

8. The apparatus of claim 2 in which the third contact member is comprised of material exhibiting volume impedance characteristics.

9. The apparatus of claim 2 in which one of the contact members is of predetermined characterized shape.

10. The apparatus of claim 2 in which at least one of the contact members is comprised of an electrode including a layer of material exhibiting volume impedance characteristics.

11. The apparatus of claim 2 in which the stationary base member is comprised of material exhibiting insulating characteristics and the second and third contact members are comprised of conductive material.

12. The apparatus of claim 2 in which the stationary base member has a "T" shaped cross section.

* * * * *